United States Patent

[11] 3,540,346

| [72] | Inventor | Gordon H. Jones<br>Van Dyne, Wisconsin |
|---|---|---|
| [21] | Appl. No. | 744,458 |
| [22] | Filed | July 12, 1968 |
| [45] | Patented | Nov. 17, 1970 |
| [73] | Assignee | Giddings & Lewis, Inc.<br>Fond du Lac, Wisconsin<br>a corporation of Wisconsin |

[54] MACHINE TOOL HAVING LONGITUDINALLY ADJUSTABLE MACHINING SPINDLE HYDRAULICALLY CLAMPED FOR OPERATION
8 Claims, 16 Drawing Figs.

[52] U.S. Cl. .................................................. 90/11, 90/16, 77/3
[51] Int. Cl. .................................................. B23c 1/12
[50] Field of Search ........................................ 90/16, 11.1, 11; 77/3

[56] References Cited
UNITED STATES PATENTS

| 2,957,393 | 10/1960 | Kampmeir | 90/11—1 |
| 3,034,408 | 5/1962 | Kampmeir | 90/11—1 |
| 3,211,060 | 10/1965 | McCann | 90/11—1 |

*Primary Examiner*—Gil Weidenfeld
*Attorney*—Olson, Trexler, Wolters and Bushnell ABSTRACT: A machine tool having a longitudinally adjustable machining spindle carried by a rotary spindle sleeve and securely clamped releasably within the sleeve by a clamping bushing encircling the spindle with very little maximum clearance therebetween and having an interference fit with encircling structure on the sleeve so that the clamping bushing has a high residual stress in compression even when released from the spindle for longitudinal adjustment of the latter with the consequence that high hydraulic pressure applied to predetermined areas of the external surface of the clamping bushing effects hard compressive contact with the spindle of bushing structure opposed by the hydraulic pressure and adjacent structure of the bushing unopposed by the hydraulic pressure is continuously forced into hard compressive contact with the encircling structure on the sleeve to the end that the spindle when clamped in a longitudinally adjusted working position is securely supported radially in a position precisely coaxial with the spindle sleeve. The clamping bushing is assembled with the encircling structure on the spindle sleeve with which it has a marked interference fit by forcing the bushing longitudinally into the encircling structure thus producing a high compressive stress in the bushing, which is subsequently ground internally with great precision to fit closely around the spindle with minimal clearance for longitudinal adjustment of the spindle.

Inventor
Gordon H. Jones
By Olson, Trexler, Wolters & Bushnell
attys.

Inventor
Gordon H. Jones
By: Olson, Tresler, Wolters & Bushnell attys.

MACHINE TOOL HAVING LONGITUDINALLY ADJUSTABLE MACHINING SPINDLE HYDRAULICALLY CLAMPED FOR OPERATION

This invention relates to machine tools in which a rotary machining spindle is longitudinally adjustable to any of an infinite number of working positions within a range of adjustment to locate in a desired working position a cutting tool carried by the outer end of the rotary spindle. Machine tools of this type afford many inherent advantages.

However, the accuracy or precision with which machining operations can be performed by such machines can be adversely affected by any inaccuracy or deviation from perfection in the precision with which the machining spindle which supports the working tool is held in the working position to which it is adjusted. Even minor inaccuracies in the positioning of the spindle which may appear to be unimportant and which may be of no consequence in performing many machining operations can cause significant imperfections in the performing of precision machining operations that must meet rigid specifications.

In such machine tools to which this invention is particularly directed, the machining spindle is supported by a rotary spindle sleeve through which the spindle is adjustable longitudinally to locate a cutting tool on the spindle in the desired working position. During a machining operation, the preadjusted spindle is hydraulically clamped to the encircling spindle sleeve to which the spindle transmits radial force reactions from the cutting tool.

The prevention of radial displacement of the spindle by radial force reactions on the spindle has been complicated by the necessity for designing the support structure for the spindle to provide, upon release of the spindle, sufficient working clearance to permit longitudinal adjustment of the spindle through its supporting structure.

The structural and functional characteristics of machine tools of this character heretofore have been significantly less than perfect with respect to precise positioning of the rotating spindle in the exact working position desired. Any significant lack of precision in the radial location of the machining spindle while it is subjected to a radial load during operation of the machine is a source of imperfections in the machining performed and can create problems in controlling the machine automatically to perform machining operations with precise accuracy.

One object of this invention is to provide a machine tool of this character having an improved and highly compact construction permitting longitudinal adjustment of the rotary machining spindle through a rotary support sleeve and functioning when energized by hydraulic fluid under high pressure to firmly clamp the spindle in its adjusted position and to securely hold the spindle in precise coaxial alignment with its rotary support sleeve against the reaction of strong radial forces on the spindle.

Another object of the invention is to provide an improved machine tool of the character recited in which clearance for longitudinal adjustment of the spindle is provided within improved spindle support structure encircling the spindle and being directly energized by hydraulic fluid under high pressure to eliminate radial clearance between the spindle and its support structure to firmly clamp the spindle in its longitudinally adjusted position and strongly support the spindle radially by spindle-engaging support structure that continuously has an overall load in compression throughout to the end that the spindle, when clamped, is securely supported radially in a position precisely coaxial with the spindle sleeve.

A further object is to provide an improved machine tool of the character recited in which the rotary machining spindle is hydraulically clamped and strongly supported axially and radially in its working position by an encircling, hydraulically energized clamping bushing having an interference fit with encircling support structure which applies to the clamping bushing a high residual stress in compression even when the bushing is hydraulically released from the spindle for longitudinal adjustment of the latter, thus storing in the clamping bushing sufficient compressive strain to provide upon application of high fluid pressure to outer portions of the bushing for hard direct engagement with the spindle of bushing portions opposed by the fluid pressure while at the same time maintaining strong compressive engagement with encircling support structure on the sleeve of bushing portions unopposed by the fluid pressure.

More specifically, an object of the invention is to provide a machine tool of the character recited in which a hydraulically actuated spindle clamping bushing is continuously contracted in diameter, in relation to its unstressed size, by a compressive stress mechanically applied by encircling support structure to diametrical extent or degree that exceeds the diametrical clearance provided between the spindle and the clamping bushing when the latter is hydraulically released from the spindle for longitudinal adjustment of the spindle, all for the purpose of supporting the spindle radially more precisely in a desired working position.

Another object is to provide a machine tool of the character recited in the preceding objects having a new and improved construction that is inherently sturdy, compact in construction, capable of affording a long and highly satisfactory service life and practical to manufacture.

Other objects and advantages will become apparent from the following description of the exemplary embodiments of the invention illustrated in the drawings, in which.

It will be appreciated that the invention is not limited to the specific construction of the two disclosed embodiments, but includes variants within the spirit and scope of the invention as disclosed and claimed.

Figure 1:
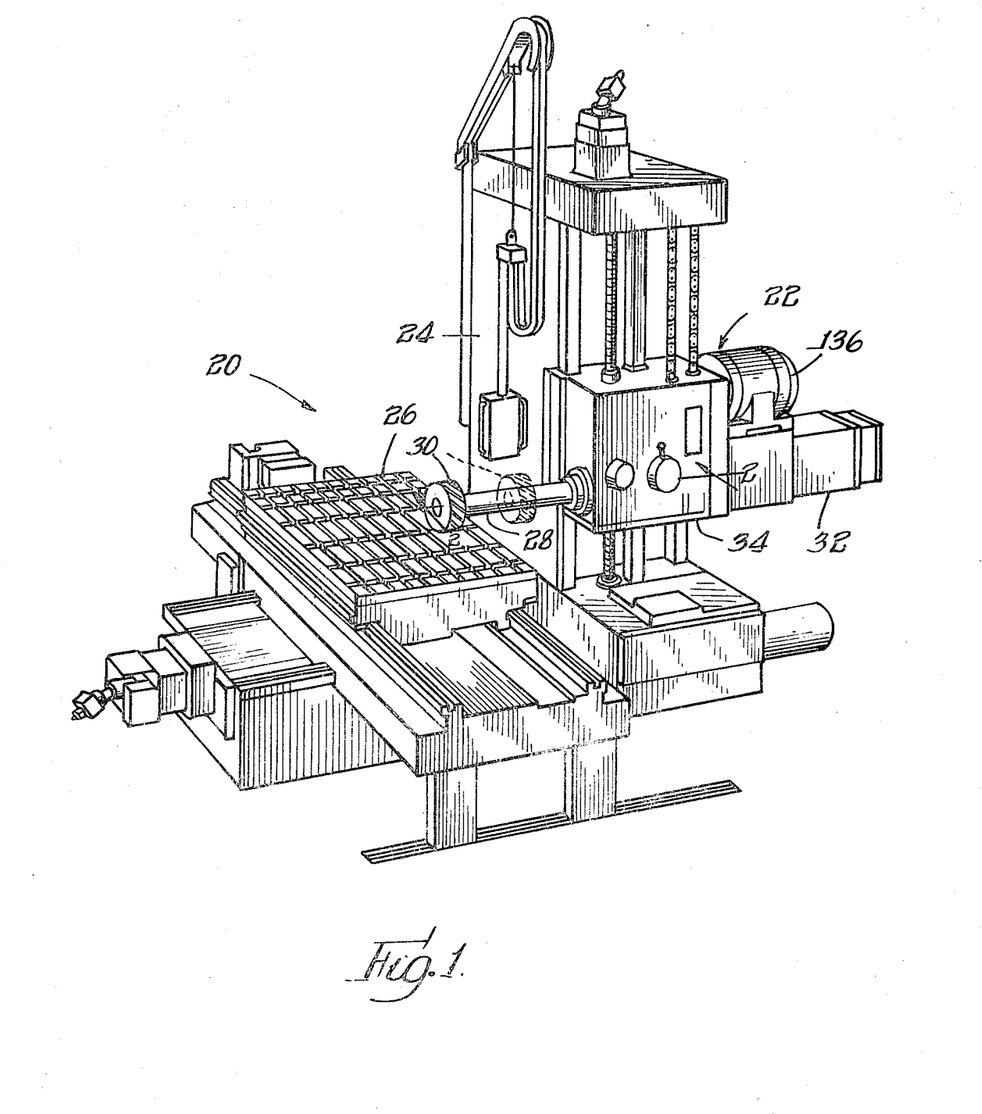
FIG. 1 is a perspective view of a machine tool embodying the invention, a longitudinally extended position of the machining spindle being shown in solid lines and a more retracted position of the machining spindle in phantom.

Having reference more particularly to the drawings, the machine tool 20, forming the exemplary embodiment of the invention illustrated in FIG. 1, comprises a machining head 22 vertically translatable along a support column 24 adjacent a work support table 26 movably positioned adjacent the base of the column 24 as shown.

A rotary machining spindle 28 carried and driven by the machining head 22 is longitudinally adjustable to an infinite number of operating positions within a substantial range of adjustment.

The spindle 28 is equipped and adapted at its outer or projecting end to support a machining tool exemplified in this instance by a rotary cutter 30 detachably secured to the outer end of the spindle. For performance of a desired machining operation on a workpiece (not shown) supported on the table 26, the spindle 28 is preadjusted longitudinally to locate the machining tool 30 precisely in the longitudinal position, with respect to the axis of the spindle 28, required for performing the machining operation at hand. Such longitudinal adjustment of the spindle 28 can be accomplished by conventional longitudinal adjusting structure for the spindle 28 accommodated within a rearward extension 32, FIG. 1, of the housing or support structure 34 of the machining head 22. Suitable adjusting means for adjusting the spindle 28 longitudinally are well known in the art and require no description here.

The machining tool, in this instance the cutter 30, carried by the projecting end of the rotary machining spindle 28, is normally subjected during a machining operation to a force reaction in a radial direction which is transmitted through the rotating spindle 28 to the support structure provided in the machining head 22 for supporting the spindle in operation.

Figure 2:
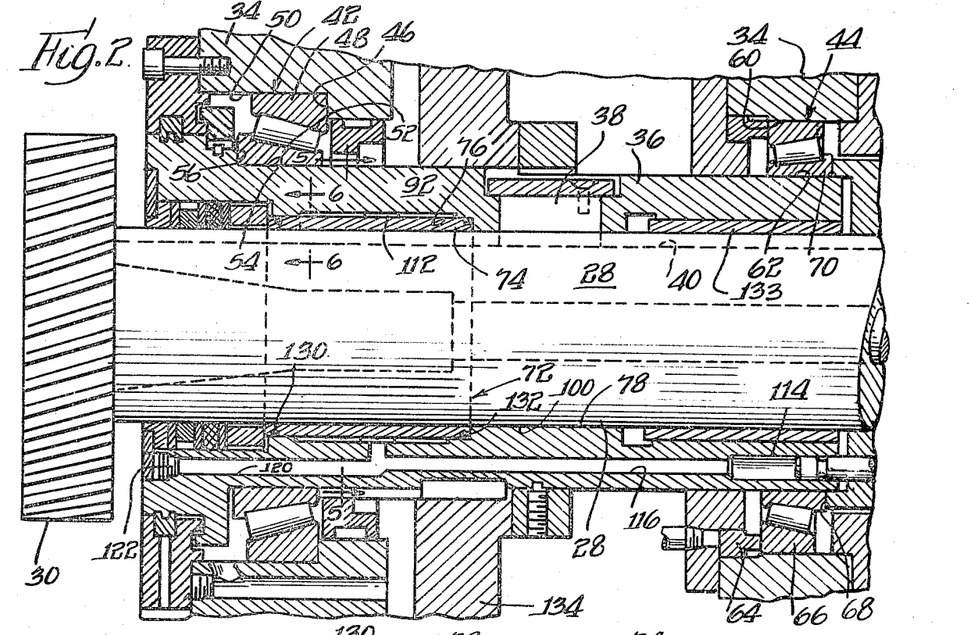
FIG. 2 is a fragmentary sectional view of the machine tool taken generally with reference to the line 2-2 of FIG. 1, illustrating the machining spindle in its substantially fully retracted position and showing the spindle and coacting spindle support structure on an enlarged scale.

As illustrated best in FIG. 2, the structure which supports the spindle 28 and sustains the force reactions on the cutting tool 30 transmitted to the spindle 28 comprises a hollow elongated spindle sleeve 36 encircling the spindle 28 and located immediately within the end of the machining head housing or support structure 34 from which the projecting end of the spindle 28 cantilevers into overlying relation to the table 26 as shown.

Figure 5:
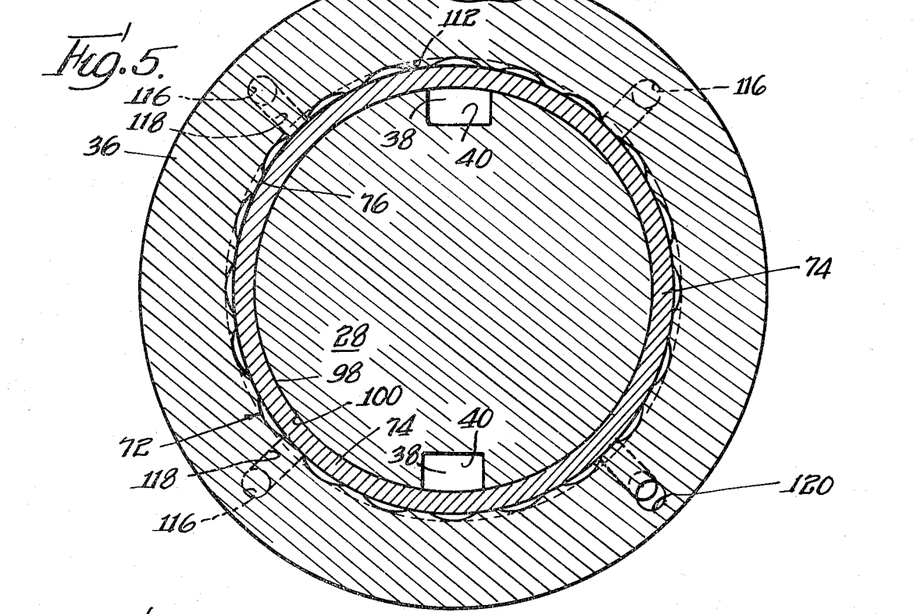
FIG. 5 is a transverse sectional view on an enlarged scale of the spindle, spindle sleeve and clamping structure, taken with reference to the line 5-5 in FIG. 2.

Even though it may be moved vertically along its support column 24 in this instance, the machining head housing or support structure 34 is, itself, rigid and constitutes rigid support structure for the spindle sleeve 36, which is keyed to rotate with the spindle 28 by two keys 38, only one of which appears in FIG. 2, carried by the sleeve 36 and extending into longitudinal keyways 40 in the otherwise cylindrical spindle 28, FIGS. 2 and 5.

The spindle sleeve 36 is precision journaled on the rigid support structure 34 preferably by two precision bearings 42, 44 encircling the sleeve 36 adjacent its inner and outer ends respectively as illustrated. The forward bearing 42 encircling the outer end of the sleeve 36 is a tapered roller bearing as shown and functions to rotatably support the sleeve 36 in a precisely accurate radial position in relation to the support structure 34 while at the same time locating the sleeve 36 axially with great precision in a predetermined longitudinal position with respect to the support structure 34.

For this purpose, an annular locating abutment 46 on the support structure 34 faces axially outward to engage and axially locate the outer race 48 of the bearing 42, which is firmly supported radially by an encircling support surface 50 on the support structure 34. The inner race 52 of the bearing 42 fits with precision around a cylindrical surface 54 on the sleeve 36 to support the sleeve radially with precision. An inwardly facing annular locating abutment 56 on the sleeve 36 fits against the axially outward face of the inner race 52 of the bearing 42 to coact with the bearing 42 and the locating abutment 56 on the support structure 34 to locate the sleeve 36 with precision in a predetermined longitudinal position on the support structure 34 as recited.

The inner precision bearing 44 is precisely supported by an encircling surface 60 on the support structure 34 and fits with precision around a cylindrical surface 62 on the sleeve 36 to provide the desired precision radial support to the inner end of the sleeve 36. Optimum functioning of both of the tapered roller bearings 42, 44 is obtained by application of a residual axial load on both bearings which is effected in this instance, as illustrated, by means of a hydraulically actuated annular biasing piston 64 engaging the outer race 66 of the bearing 44 to transmit through the bearing 44 an axial biasing force that is transmitted to the sleeve 36 by an annular abutment 68 formed on the sleeve and engaging the inner bearing race 70 as shown. The axial biasing load applied to the sleeve 36 in this manner is transmitted through the sleeve back to the bearing 42 to assure at once optimum functioning of both bearings in supporting the sleeve 36 for rotation in a location that is determined with great precision both axially and radially.

At this juncture, it should be appreciated that any deviation or deflection of the machining spindle 28 from a precisely coaxial relation to the encircling sleeve 36 journaled by the precision bearings 42, 44 will produce a corresponding imperfection in the accuracy with which machining is performed by the machining tool supported by the spindle. This follows from the fact that any deviation from perfection in the accuracy with which the supported machining tool 30 is held in a desired machining position is a source of a corresponding deviation from perfection in the accuracy with which machining is performed and can be a significant problem in the performing of machining to precise dimensional tolerances.

The problem of maintaining the rotating spindle 28 in precisely coaxial relation to the rotating spindle sleeve 36 during operation of the machine is complicated by the severe force reactions, particularly radial reactions, of the machining tool 30 on the spindle 28.

Attainment of the objective of holding the spindle 28 in precisely coaxial relation to the supporting sleeve 36 against the force reactions tending to displace the spindle radially in relation to the sleeve 36 is further complicated severely by the necessity for providing between the spindle and its support structure, when the spindle is released for longitudinal adjustment, sufficient clearance to allow the spindle to move longitudinally in relation to its support structure. By the use of a precision machining techniques, the clearance provided between the spindle 28 and its coacting support structure for the purpose of allowing longitudinal adjustment of the spindle, which is essential to the inherent character of a machine tool of this type, can be confined to a minimal dimensional value.

Yet, it is most desirable that this minimal clearance provided between the spindle 28 and its support structure not become a source of error in the accuracy with which the spindle 28 and the sleeve 36 are held in coaxial relation to each other under the radial load reaction on the spindle.

While these considerations may be of limited consequence in the performing of rough machining operations where precise accuracy is not essential, they take on great importance in the performance of machining operations where even minute deviations from theoretical perfection are undesirable. Ideally speaking, it is highly desirable that deviation of the spindle 28 from perfect coaxial alignment with the sleeve 36 be totally eliminated in order that there be no error present that could be cumulative with other small errors in the machine tool to produce an aggregate error that could be troublesome, particularly in the operation of the machine tool under automatic control, which offers many advantages.

After being preadjusted longitudinally to the desired machining position, the spindle 28 is releasably held securely in its longitudinally preadjusted position for machining by hydraulically applied clamp or clutch means 72 carried by the forward or outer end of the sleeve 36 and constructed in accordance with the invention to selectively free the spindle 28 for longitudinal adjustment and to function when applied hydraulically to securely hold the spindle 28 radially in coaxial alignment with the sleeve 36 to the end that radial displacement of the spindle 28 out of coaxial alignment with the sleeve 36 by the radial force reaction of the machining tool 30 on the sleeve 36 is virtually eliminated and, in any event, highly minimized to great advantage in relation to corresponding operational characteristics of conventional machine tools of this character.

The hydraulically energized clamp or clutch means 72 provided for this purpose, FIGS. 2 through 7, comprise a cylindrical clamping bushing 74 fashioned preferably from a seamless length of high-strength resilient steel. The clamping bushing 74 is fitted within the outer end of the sleeve 36 in encircling relation to the spindle 28 in a manner to be described and is dimensioned internally to allow the spindle 28 to be adjusted longitudinally through the bushing 74 when the clamp means 72 is released to allow axial displacement of the spindle.

As will be described in detail, the clamping sleeve bushing 74 is forced radially inward into hard engagement with the spindle 28 by actuating fluid under very high pressure acting on the outer surface of the clamping bushing 74. This allows no radial displacement of the spindle 28 in relation to the clamping bushing 74. At the same time, portions of the clamping bushing 74, immediately contiguous to clamping bushing portions forced into hard engagement with the sleeve 36, are caused to remain at the same time in hard compressive engagement with encircling support structure on the sleeve 36 with the consequence that the clamping bushing 74 is not subject to radial displacement in relation to the sleeve 36, and the spindle 28 is strongly held in precise coaxial relation to the sleeve 36, as will presently appear.

To provide the strong compressive engagement of the clamping bushing 74 with encircling support structure on the sleeve 36 to exist in operation of the machine simultaneously with hard compressive engagement of the clamping bushing 74 with the spindle 28, the clamping bushing 74 is assembled with encircling structure on the sleeve 36 in such manner that the clamping bushing 74 is continuously contracted forcibly in diameter, producing in the clamping bushing 74 a residual compressive stress of great magnitude existing independently of hydraulic pressure applied to the external surface of the clamping bushing and serving to maintain positive compressive engagement of the clamping bushing with encircling support structure on the sleeve 36 when the clamping means 72 is hydraulically energized to hold the spindle 28 against axial and radial displacement during operation of the machine.

In the preferred construction illustrated in FIGS. 1 through 11, the clamping bushing 74 is force fitted axially into an outwardly open clamp bore 76 formed in the outer end of the sleeve 36 in coaxial relation to the spindle 28 to receive the bushing 74, as shown. In point of fact, the bushing-receiving clamp bore 76 constitutes a counterbore in the outer end of a central axial bore 78 formed within the sleeve 36 to receive the spindle 28.

Forced, residual radial contraction of the clamping bushing 74 to obtain the desired residual loading of the clamping bushing in compression is obtained by dimensioning the clamping bushing 74, with reference to the size it has while still free of externally applied stress, so that it is considerably larger in diameter than the clamp bore 76 before the clamping bushing is assembled axially into the bore 76, as will be described. The resulting interference fit of the clamping bushing 74 with respect to the clamp bore 76 induces residual compressive stress in the clamping bushing.

The dimensional relationship of the clamping bushing 74 to the clamp bore 76 within the outer end of the sleeve 36 and the manner in which the clamping bushing and the sleeve are force fitted into assembled relation with each other are illustrated in FIGS. 8 to 11.

By way of example, the seamless clamping bushing 74, which is preferably made of high-strength resilient steel as mentioned, may have a wall thickness of three-sixteenths of an inch in a machine tool in which the spindle 28 has a diameter of 3½ inches. The outer cylindrical surface 78, FIGS. 9 and 10, of the bushing 74 is finish ground to a diametrical dimension that is accurate within .002 of an inch. The clamp bore 76 is similarly finish ground to a diameter that is accurate within .001 of an inch.

In the example referred to in which the clamping bushing 74 has an outer diameter of approximately 3⅞ inches, the bushing having a wall thickness of three-sixteenths of an inch, the diameter of the external cylindrical surface 78 of the bushing 74, before assembly of the bushing 74 into the bore 76, exceeds the diameter of the clamp bore 76 by a differential dimension in diameter of the order of fourteen thousandths (.014) to seventeen thousandths (.017) of an inch.

Figure 10:
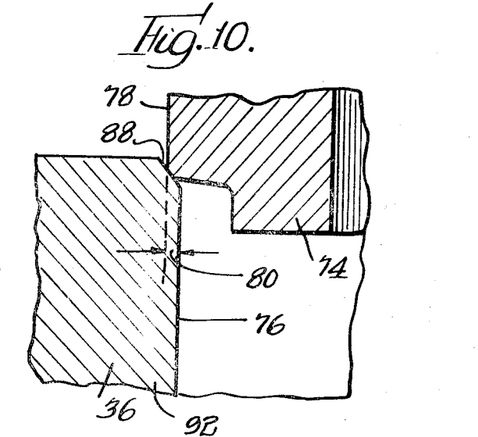
FIG. 10 is a fragmentary sectional view similar to the medial portion of FIG. 9, but showing the relative position of the inner end of the clamping bushing to the outer end of the sleeve bore as the two components are placed in abutting coaxial relation to each other at the beginning of forced insertion of the bushing into the sleeve, the radial overlap of the parts being somewhat exaggerated for the purpose of illustration.
Figure 11:
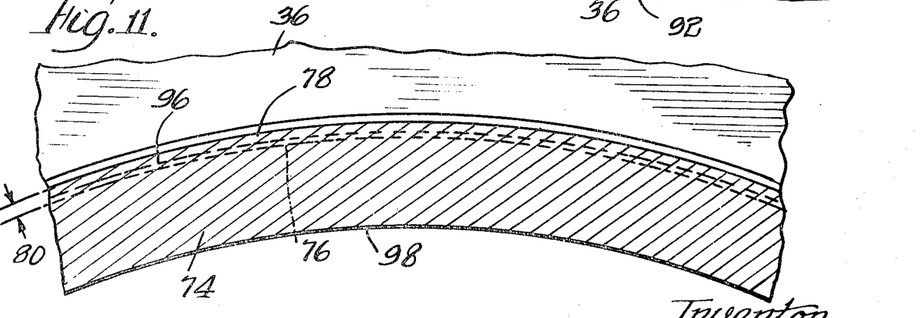
FIG. 11 is a fragmentary, radial sectional view taken with reference to the line 11–11 in FIG. 9 and illustrating the radial deformation of the clamping bushing incident to forced assembly of the bushing and sleeve, the radial deformation of the bushing again being exaggerated somewhat for purposes of illustration.

The larger diametrical size of the cylindrical external surface 78 of the clamping bushing 74 in relation to the diametrical size of the clamp bore 76, before forced assembly of the clamping bushing into the clamp bore 76, is illustrated best in FIG. 10 where the larger differential radius of the external bushing surface 78 in relation to the bore surface 76 is substantially exaggerated for the purpose of illustration and denoted graphically in FIG. 10 and also in FIG. 11 by the number 80.

Figure 8:
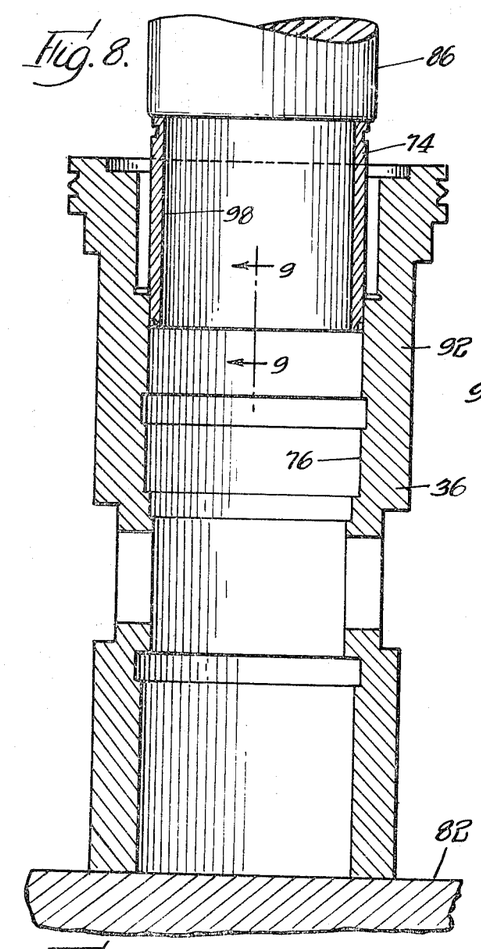
FIG. 8 is a longitudinally sectioned side view depicting, for the purpose of illustration, the manner in which the clamping bushing is forced, with an interference fit, longitudinally into a bushing receiving bore in the spindle sleeve to produce a high residual compressive stress in the clamping bushing.

The manner in which the clamping sleeve 74 is force fitted into the clamp bore 76 in the sleeve 36 is illustrated in FIG. 8 wherein for the purpose of illustration the sleeve 36 is supported at one end by a support element or anvil 82 while the bushing 74 is forced axially into the bore 76 by an axially movable ram 86, illustrated schematically and actuated, for example, by a hydraulic press.

With respect to the particular dimensional example mentioned by way of illustration, a force of approximately 2½ tons may be required to force the clamping bushing 74 axially into the encircling sleeve bore 76.

Such forced assembly of the clamping bushing 74 into the sleeve bore 76 is accompanied by a contraction in the diametrical size of the bushing 74 affected at the axially outer end of the sleeve bore 76 and progressing axially along the bushing 74 as assembly of the parts progresses. Such forced contraction in the diameter of the bushing 74 is aided by an annular chamfer or bevel 88 formed on the sleeve 36 at the outer end of the bore 76 to flare radially outward in an axially outward direction. The contraction in the radial size of the exterior bushing surface entering the bore 76 is illustrated graphically in FIG. 9 and denoted by the number 90.

The compressive residual stress induced in the clamping bushing 74 as an incident to such forced squeezing of the bushing by the encircling sleeve 36 reacts radially outward on the sleeve 36 to produce some enlargement in the diameter of the sleeve bore 76, the degree to which the sleeve bore 76 is enlarged in diameter being limited only to a minor fraction of the degree to which the external bushing surface 78 is restricted in diameter by reason of the forward portion 92 of the sleeve 36, which encircles the bushing 74, having a radial thickness and hence strength greatly in excess of the radial thickness and corresponding strength of the clamping bushing 74. The forced enlargement of the sleeve bore 76 caused by the radially outward reaction of the bushing 74 on the sleeve 36, is produced, as illustrated graphically in FIG. 9, by the axial progression of the inner end 94 of the bushing surface 78 into the bore 76.

Figure 9:
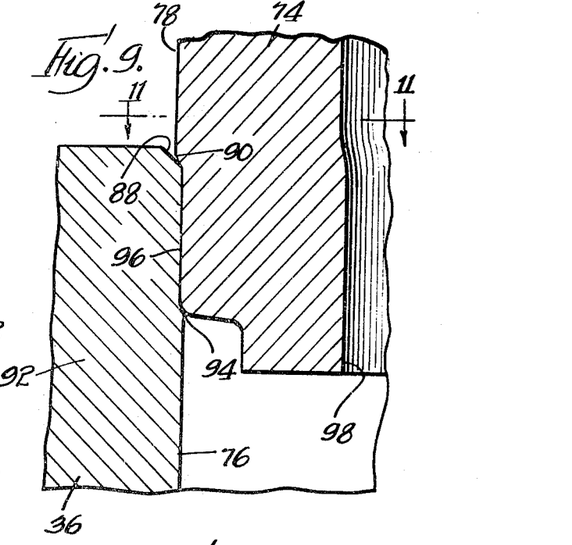
FIG. 9 is a fragmentary longitudinal sectional view taken with reference to the line 9-9 in FIG. 8 and showing in radial section the manner in which the clamping bushing is stressed in compression progressively along its axial length as an incident to forced insertion of the clamping bushing into the encircling sleeve with which it has an interference fit, the radial deformation of the parts being exaggerated somewhat in FIG. 9 for the purpose of illustration.

When axial assembly of the clamping bushing 74 into the bore 76 is completed, the external bushing surface 78, contracted in diameter, and the clamp bore surface 76, enlarged in diameter but to a lesser degree, are forced hard against each other along a common interface, denoted in FIGS. 9 and 11 by the number 96, by virtue of the radially outward reaction of the compressive stress induced in the clamping bushing 74.

Figure 6:
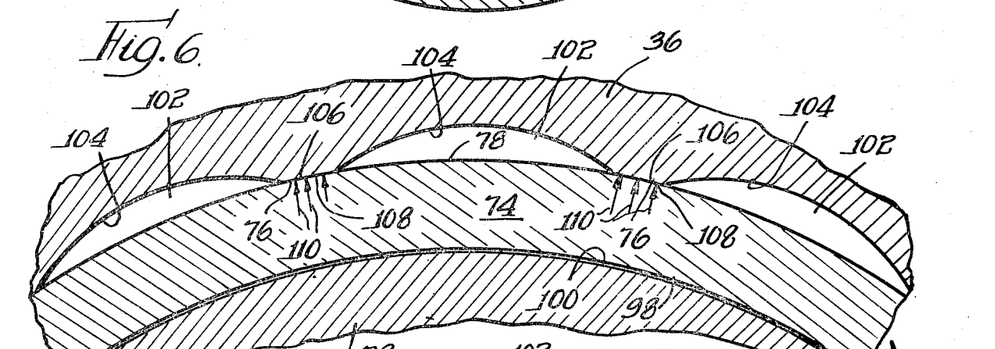
FIG. 6 is a fragmentary transverse sectional view on a much enlarged scale taken with reference to the line 6-6 of FIG. 2 and illustrating the relationship of the spindle-clamping bushing to an encircling portion of the spindle sleeve and to the encircled spindle when the latter is released for longitudinal adjustment, the clearance existing between the spindle and the encircling clamping bushing being highly exaggerated for purposes of illustration.

After the clamping bushing 74 is assembled into the sleeve 36, the internal cylindrical surface 98 of the clamping bushing is finished ground with great precision in relation to the external cylindrical surface 100, FIGS. 5 and 6, of the spindle 28 that is also finish ground with precision to provide between the internal clamping bushing surface 98 and the external spindle surface 100, when the clamping bushing 74 is released from the spindle, a minimal clearance requisite to allowing longitudinal adjustment of the spindle through the clamping bushing. For this purpose, the internal surface 98 of the clamping bushing 74, with reference to the dimensional example previously referred to, is ground to have a diameter exceeding that of the cylindrical spindle surface 100 by a differential diametrical dimension of the order of six ten-thousandths (.0006) to eight ten-thousandths (.0008) of an inch.

In this connection, it should be noted that the diameter of the external surface 78 of the clamping bushing 74, measured with respect to the unstressed size of the bushing 74 before assembly of the bushing and sleeve 36 together, exceeds the diameter of the bushing-receiving sleeve bore 76 before forced enlargement of the latter as described, with reference to the dimensional example referred to, by a differential diametrical dimension which is of the order of 25 to 30 times greater than the diametrical clearance existing between the internal surface 98 of the clamping bushing 74 and the external spindle surface 100 when the clamping bushing is released from the spindle for longitudinal adjustment of the latter.

As will presently appear, these dimensional relationships of the parts are significant in maintaining the desired compressive engagement between the external surface 78 of the clamping bushing 74 and the encircling clamp bore 76 when the clamping bushing 74 is actuated hydraulically, as will be explained, to hold the spindle 28 in operating position.

As shown in FIGS. 2 through 7, the sleeve clamp bore 76, which receives the clamping bushing 74, is internally shaped to define in conjunction with the exterior cylindrical surface 78 of the clamping bushing 74 a plurality of plenum cavities 102 disposed in a pattern encompassing the clamping bushing 74.

In the preferred construction illustrated in FIGS. 2 through 7, the plenum cavities 102 are formed by a plurality of circumferentially spaced longitudinal grooves 104, of crescent form in radial section, FIG. 6, machined in the inner wall of the sleeve bore 76 in confronting relation to the exterior cylindrical surface 78 of the clamping bushing 74.

Figure 3:
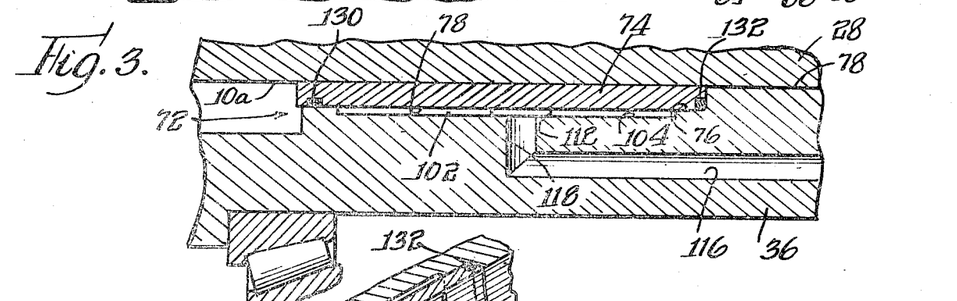
FIG. 3 is a fragmentary sectional view on a still larger scale illustrating in radial section hydraulically energized spindle-clamping structure in relation to adjacent portions of the machining spindle and its support sleeve that are releasably clamped together by the clamping structure.
Figure 4:
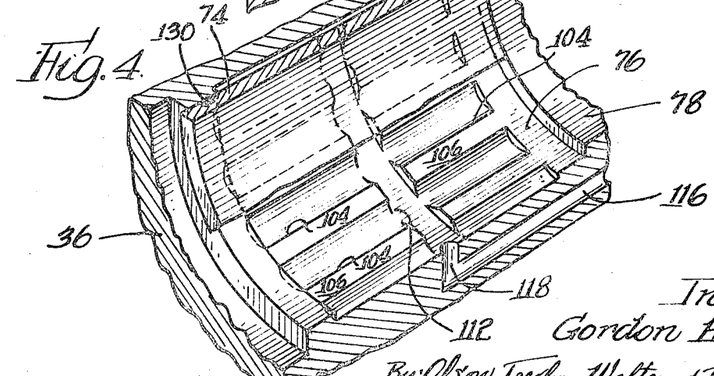
FIG. 4 is a fragmentary perspective view on an enlarged scale illustrating from an internal point of view the construction of the spindle-clamping structure, with the illustrated portion of the clamping bushing broken away to reveal underlying structure.

As shown in FIGS. 2 to 4, the grooves 104 terminate at opposite ends somewhat short of the respective ends of the external bushing surface 78. The circumferentially spaced grooves 104 are separated physically by intervening lands 106, FIGS. 6, on the sleeve 36 defining corresponding portions 108 of the cylindrical bore surface 76.

Figure 7:
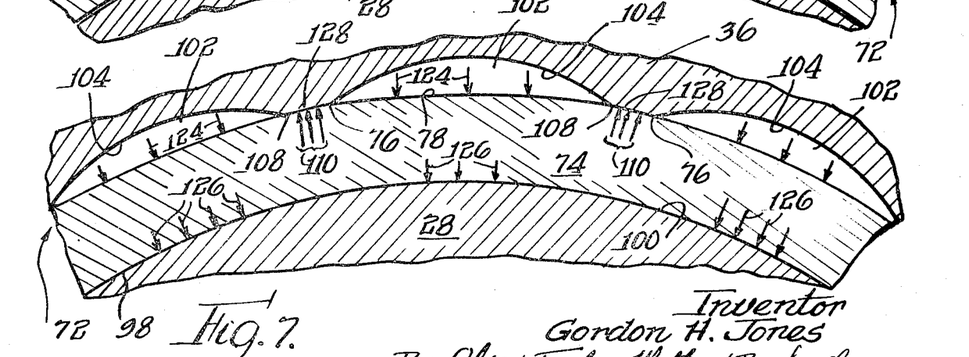
FIG. 7 is a fragmentary sectional view similar to FIG. 6 but depicting the relationship of the parts when the hydraulically energized clamp is activated to clamp the spindle to the encircling sleeve to hold the spindle in its longitudinally adjusted position and in precise coaxial relation to the encircling sleeve.

As indicated by the small arrows 110 in FIGS. 6 and 7, the diametrically compressed clamping bushing 74, by virtue of its residual compressive stress, forces itself outwardly hard against the bore surface portions 108 to establish a hard mechanical engagement between the clamping bushing 74 and sleeve bore surface portions 108 bounding the edges of the grooves or recesses 104. As will be described, this firm mechanical engagement of contacting portions of the clamping bushing and sleeve is maintained during hydraulic application of the clamp to the spindle.

Communication with all the plenum cavities 102 for controllably supplying actuating fluid to the cavities is provided, as illustrated in FIGS. 2 to 4, by an annular channel 112 cut in the inner periphery of the sleeve bore 76 to a radial depth approximating that of the grooves 104 and cutting laterally across the medial portions of all the grooves 104.

Clamp-applying fluid is supplied to the channel 112 under a very high clamp-engaging pressure of the order of 5,000 pounds per square inch. As illustrated in FIG. 2, high-pressure, clamp-applying fluid is pumped to the channel 112 by high pressure pump means rotatable with the sleeve 36 and comprising, as illustrated, a plurality of circumferentially spaced piston pumps 114, only one of which is shown in FIG. 2, provided in the inner end of the sleeve 36 and connected through forwardly extending bores or passages 116 in the sleeve 36 with radial passages 118 communicating with the channel 112 as shown. A filler passage 120 capped by a removable plug 122 provides for filling and refilling of the high pressure fluid space containing clamp actuating fluid and including the cavities 102.

When the spindle 28 is preadjusted longitudinally to the exact operating position desired, the high-pressure pumping means 114 is actuated to pressurize the spaced cavities 102 to a very high clamp-applying pressure, of the order of 5,000 p.s.i. as indicated, with the consequence that spaced portions of the exterior surface 78 of the clamping sleeve 74 opposing the corresponding cavities 102 are forced radially inward by very powerful forces of fluid pressure represented in FIG. 7 by the arrows 124.

As a consequence, the arcuate curvature of the clamping bushing portions subjected to the forces of fluid pressure in the cavities 102 is modified under such forces of fluid pressure to engage the inner surfaces of corresponding portions of the clamping bushing with the opposing exterior surface 100 of the spindle 28. The compressive forces by which spaced portions of the bushing 74 aligned with the respective cavities 102 are urged inwardly into fast engagement with the spindle 28 are represented in FIG. 7 by the arrows 126.

By virtue of the high residual compressive stress in the clamping bushing 74 produced as a consequence of the previously described interference fit between the clamping bushing 74 and the encircling sleeve 36, the portions 128, FIG. 7, of the exterior clamping bushing surface 78 intervening between the successive cavities 102 and confronting the spaced lands 106 on the inner periphery of the sleeve bore 76 are continuously forced and maintained in hard compressive contact with the land surfaces 108 even when the cavities 102 are fully pressurized to clamp the spindle in its working position as described.

As a consequence, during application of the clamp to hold the spindle in its operating position, the clamping bushing 74 is caused to have hard direct contact at once with both the exterior surface 100 of the spindle 28 and with the encircling sleeve bore 76 at a multiplicity of locations disposed in an annular pattern encircling the spindle 28. As a result of the clamping bushing 74 being forced into hard direct contact by its residual compressive stress with the encircling bore 76 while the clamping bushing is at the same time forced into hard direct contact with the preadjusted spindle 28, there is no oil film or clearance space existing between the spaced engagements of the clamping bushing with the spindle 28 and the bore 76 such that could otherwise give rise to radial play of the clamping bushing 74 with respect to the sleeve 36 when the clamp is applied.

With reference to the construction illustrated in FIG. 7, which shows the clamp applied, the clamping bushing 74 is subjected to an overall load in compression and remains in direct compressive contact with both the spindle 28 and sleeve 36 to strongly hold the spindle 28 and sleeve 36 in perfect coaxial alignment as the spindle and sleeve turn together in a machining operation.

In conjunction with the compressive engagement continuously maintained between the clamping bushing 74 and the encircling sleeve bore 76 even when the clamp is applied, it is noteworthy that pressurized fluid is prevented from escaping from the cavities 102 primarily by the continuously maintained direct contact of the exterior surface 78 of the clamping bushing with encircling portions of the inner periphery of the bore 76 extending around the respective cavities 102. To provide added protection against the escape of actuating fluid from between the clamping bushing 74 and the encircling sleeve 36, two O-ring seals 130, 132 are provided between the bushing 74 and the sleeve bore 76 in encircling relation to opposite ends of the bushing 74 as shown in FIGS. 2 and 3.

It may be noted here that the sleeve 36 which functions to rotate as well as to support the spindle 28 is driven by a bull gear 134 drivingly secured to the sleeve 36 and driven by a conventional drive mechanism in the machining head 22 powered by a motor 136, FIGS. 1 and 2. A sleeve bearing 133 fitted in the inner end of the spindle sleeve 36, as shown in FIG. 2, closely encircles the spindle 28 to provide radial support to a segment of the spindle spaced axially inward from the hydraulic clamp 72.

In the modified embodiment of the invention illustrated in FIGS. 12 through 16, component elements corresponding to the embodiment previously described are identified with the same reference numbers with the addition of the suffix $a$.

Figure 12:
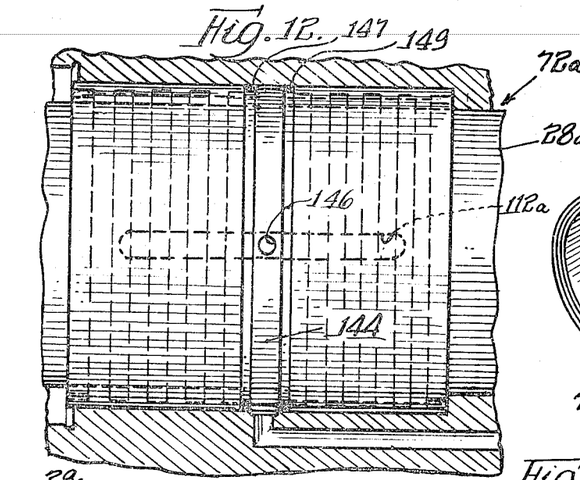
FIG. 12 is a fragmentary longitudinal sectional view corresponding to the medial portion of FIG. 2 and illustrating on a somewhat enlarged scale a modified construction of the hydraulically energized clamp fitted between the spindle and spindle sleeve to releasably clamp the two together.
Figure 13:
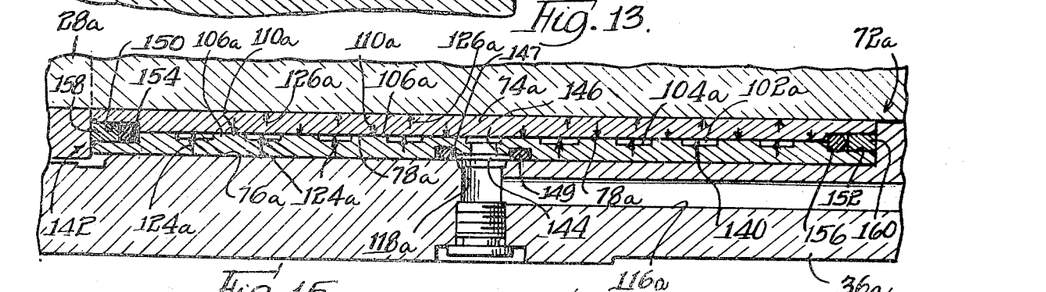
FIG. 13 is a fragmentary longitudinal sectional view corresponding to FIG. 3 but illustrating the modified construction of FIG. 12.
Figure 14:
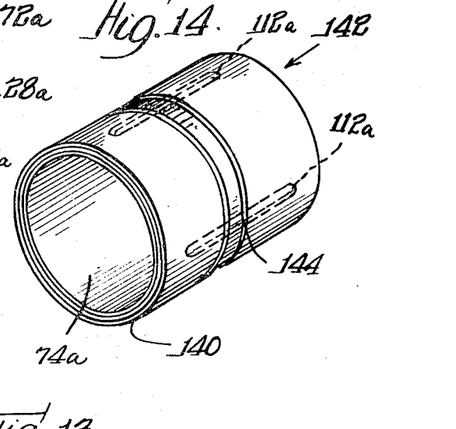
FIG. 14 is a perspective view of the hydraulically energized clamping element of modified construction illustrated in FIGS. 12 and 13.
Figure 15:
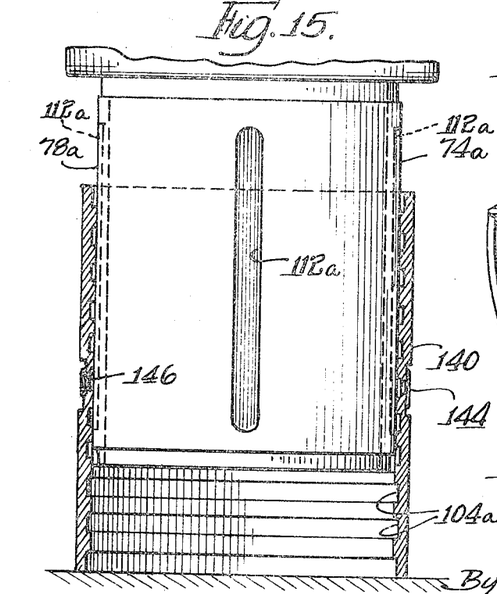
FIG. 15 is a partially sectioned side view illustrating forced assembly together of two coaxial components of the two-part clamping element of FIG. 14 to provide the desired residual stress in compression in the inner element.

The spindle encircling clamp bushing 74a of the hydraulic clamp 72a, illustrated in FIGS. 12 to 16, is forced axially, as illustrated in FIG. 15, into an outer bushing 140 of substantially the same length and approximately the same radial thickness to form the two-part clamping subassembly 142 shown in perspective in FIG. 14.

The inner clamping bushing 74a and the outer bushing 140 have an interference fit with each other. By way of example, the outer diameter of the clamping bushing 74a may exceed the inner diameter of the outer bushing 140 before forced assembly of the two bushings together by a differential diametrical dimension of the order of twenty-five thousandths (.025) of an inch, this example being given for an installation in which the inner diameter of the clamping bushing 74a is of the order of 5 inches and the bushings 74a and 140 are each approximately three-eighths of an inch in thickness. Both bushings are formed of high-strength resilient steel.

The dimensional degree of the diametrical interference provided between the inner and outer bushings is in excess of that mentioned by way of example previously referred to by reason of the outer bushing 140 having a thickness less than that of the bushing portion 92 which encircles the clamping bushing 74 of the first described embodiment, FIG. 2. The greater degree of the interference fit provided between the bushing 74a and the outer bushing 140 allows for a higher degree of diametrical expansion of the outer bushing 140 while at the same time providing the desired degree of residual radial compression and compressive loading of the inner clamping bushing 74a.

As shown in FIGS. 12 and 13, the dual-bushing clamping assembly 142 is fitted into the clamp bore 76a in the encircling sleeve 36a to encircle the spindle 28a.

Figure 16:
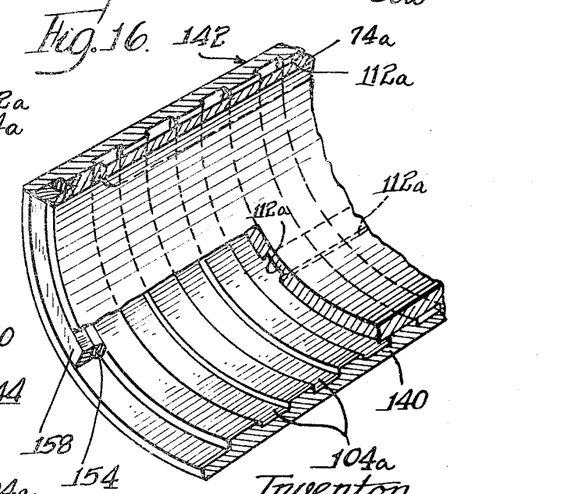
FIG. 16 is a fragmentary, longitudinally sectioned perspective view illustrating from an internal point of view the construction of the clamping element of FIG. 14, the inner component of which is partially broken away to better reveal the shaping of the inner periphery of the outer component of the clamping element.

In this instance, the grooves 104a which coact with the external cylindrical surface 78a of the clamping sleeve 74a to define the high-pressure cavities 102a are annular in form, being cut in the inner periphery of the bushing 140 in axially spaced relation to each other as shown in FIGS. 13, 15 and 16. Thus, the clamping bushing 74a is encircled by a plurality of axially spaced annular clamping cavities 102a.

A shallow circumferential groove 144 cut in the exterior surface of the outer bushing 140, as illustrated in FIGS. 12 to 15, registers with the radial extensions 118a of the high-pressure fluid supply passages 116a to receive high-pressure actuating fluid which is directed through radial ports 146 in the bushing 140 to four fluid distribution channels 112a intervening between the bushings 74a and 140 and communicating with all the high-pressure cavities 102a. In this instance, four circumferentially spaced axially extending fluid distribution channels 112a are provided and for convenience are cut in the exterior surface 78a of the inner clamping bushing 74a. Four radial ports 146, previously mentioned, are provided in the outer bushing 140 extending between the respective axial channels 112a and the bottom of the groove 144 fed by the high pressure fluid passages 118a. As shown in FIG. 13, opposite side edges of the shallow groove 144 are deepened to receive two O-ring seals 147, 149 encircling the bushing 140 and engaging the sleeve bore 76a to prevent fluid from escaping axially along the bushing 140.

As indicated by the arrows 110a in FIG. 13, the residual compressive stress induced in the inner clamping bushing 74a continuously holds spaced annular segments of the bushing 74a in firm direct engagement with annular lands 106a formed on the outer bushing 140 in intervening relation to the cavities 102a while annular portions of the inner bushing 74a aligned with the cavities 102a are forced into hard direct engagement with the spindle 28a, as indicated by the arrows 126a, by the radial inward forces of fluid pressure in the cavities 102a denoted in FIG. 13 by the arrows 124a.

Radial play between the clamping sleeve assembly 142, FIGS. 13 and 14, and the sleeve 36a is precluded by a close fit provided between the bushing 140 and the sleeve bore 76a which is further assured upon energization of the clamp by a tendency of the outer bushing 140 to swell radially against the sleeve bore 76a to preclude radial play of the bushing assembly 142 with reference to the sleeve.

At opposite ends of the bushing assembly 142, the interface between the inner and outer bushings 74a and 140 is radially enlarged to provide seal grooves 150, 152 opening axially outward to accommodate two O-ring seals 154, 156 held against outward displacement by retaining rings 158, 160 secured in the outer ends of the respective grooves 150, 152.

I claim:

1. A machine tool comprising, in combination, a work-support table, rigid support structure located near said table, a rotary spindle sleeve, bearing means supporting said sleeve rotatably on said support structure for rotation in a predetermined location in relation to the support structure, a machining spindle slidably disposed in said sleeve for rotation therewith and having a work-support table end adapted to support a machining tool, said spindle being longitudinally adjustable with respect to said sleeve to project said table end of the spindle a variable distance from the sleeve, said sleeve including means defining a clamp for substantially coaxial with said spindle and being substantially larger in diameter than said spindle, a clamping bushing having in its unstressed condition an outside diameter somewhat larger than the inside diameter of said clamp bore to provide an interference fit between said clamping bushing and said means defining said clamp bore, said clamping bushing being forced axially into said clamp bore so that the clamping bushing is encircled by said clamp bore defining means and is forcibly shrunk by the latter in diameter thereby producing in the clamping bushing a high residual stress in compression, the exterior surface of the clamping bushing and said clamp bore defining means being shaped in relation to each other to define therebetween a plurality of circumferentially spaced plenum cavities extending axially along the clamping bushing, said clamping bushing and clamp bore defining means being shaped in relation to each other to define high-pressure fluid channel space communicating with said plenum cavities, said sleeve defining a fluid supply passage communicating with said channel space to supply high-pressure spindle clamping fluid therethrough to said plenum cavities; said clamping bushing being internally ground in place within said clamp bore defining means to define within the clamping bushing a spindle bore receiving said spindle and having a diameter, when said plenum cavities are under atmospheric pressure, that provides around the spindle a minimal clearance for longitudinal adjustment of the spindle; high-pressure fluid supply means rotatable with said sleeve to supply clamping fluid under high pressure through said passage to said plenum cavities to effect clamping engagement of said clamping bushing with said spindle; and said clamping bushing having an outer diameter, measured with respect to the size that would be assumed by the bushing were it free of externally applied stress, that exceeds the inner diameter of said clamp bore by a dimension that is greater than the differential diametrical dimension by which the inner diameter of the bushing exceeds the outer diameter of the spindle when the bushing and the clamp bore defining means are assembled together and said plenum cavities are under atmospheric pressure with the consequence that the clamping bushing remains under an overall load in compression throughout upon supplying of hydraulic fluid under high pressure to said plenum cavities to effect a clamping engagement of said clamping bushing against said spindle to support said spindle in a precisely coaxial, longitudinally preadjusted position in relation to said spindle sleeve.

2. A machine tool comprising, in combination, support structure, a rotary spindle sleeve supported rotatably on said support structure for rotation in a predetermined location in relation to the support structure, a machining spindle slidably disposed in said sleeve for rotation therewith and having a projecting end adapted to support a machining tool, said spindle being longitudinally adjustable with respect to said sleeve to extend said projecting end of the spindle a variable distance from the sleeve, said sleeve including means defining a clamp bore substantially coaxial with said spindle and being substantially larger in diameter than said spindle, a clamping bushing having in its unstressed condition an outside diameter somewhat larger than the inside diameter of said clamp bore to provide an interference fit between said clamping bushing and said means defining said clamp bore, said clamping bushing being forced axially into said clamp bore so that the clamping bushing is encircled by said clamp bore defining means and is forcibly shrunk by the latter in diameter thereby producing in the clamping bushing a high residual stress in compression, the exterior surface of the clamping bushing and said clamp bore defining means being shaped in relation to each other to define therebetween a plurality of plenum cavities, said sleeve defining fluid supply passage space communicating with said plenum cavities; said clamping bushing being internally finished in place within said clamp bore defining means to define within the clamping bushing a spindle bore receiving said spindle and having a diameter, when said plenum cavities are under atmospheric pressure, that provides around the spindle a minimal clearance for longitudinal adjustment of the spindle; high-pressure fluid supply means rotatable with said sleeve to supply clamping fluid under high pressure through said passage space to said plenum cavities to effect clamping engagement of said clamping bushing with said spindle; and said clamping bushing having an outer diameter, measured with respect to the size that would be assumed by the bushing were it free of externally applied stress, that exceeds the inner diameter of said clamp bore by a dimension that is greater than the differential diametrical dimension by which the inner diameter of the bushing exceeds the outer diameter of the spindle when the bushing and the clamp bore defining means are assembled together and said plenum cavities are under atmospheric pressure with the consequence that the clamping bushing remains under an overall load in compression throughout upon supplying of hydraulic fluid under high pressure to said plenum cavities to effect a clamping engagement of said clamping bushing against said spindle which strongly holds said spindle in its longitudinally adjusted position and in precisely coaxial relation to said spindle sleeve.

3. A machine tool comprising, in combination a work-support table, rigid support structure located near said table, a rotary spindle sleeve, precision-bearing means supporting said sleeve rotatably on said support structure for rotation in a predetermined location in relation to the support structure, a machining spindle slidably disposed in said sleeve for rotation therewith and having a work-support table end adapted to support a machining tool, said spindle being longitudinally adjustable with respect to said sleeve to project said table end of the spindle a variable distance from the sleeve, said sleeve including means defining a clamp bore substantially coaxial with said spindle and being substantially larger in diameter than said spindle, a clamping bushing having in its unstressed condition an outside diameter somewhat larger than the inside diameter of said clamp bore to provide an interference fit between said clamping bushing and said means defining said clamp bore, said clamping bushing being forced axially into said clamp bore so that the clamping bushing is encircled and engaged by said clamp bore defining means and is forcibly shrunk by the latter in diameter thereby producing in the clamping bushing a high residual stress in compression, the exterior surface of the clamping bushing and said clamp bore defining means being shaped in relation to each other to define therebetween a plurality of circumferentially spaced plenum cavities extending axially along the clamping bushing, said sleeve including means thereon defining fluid supply passage space communicating with said plenum cavities; said clamping bushing defining therein a spindle bore receiving said spindle and having a diameter, when said plenum cavities are under atmospheric pressure, that provides around the spindle a minimal clearance for longitudinal adjustment of the spindle; and high-pressure fluid supply means rotatable with said sleeve and communicating with said passage space to supply clamping fluid therethrough under high pressure to said plenum cavities; the portion of said clamping bushing in the area of said plenum cavities having a substantial thickness to provide a relatively rigid interconnection with the portions of said bushing in engagement with said bore defining means, such that said clamping fluid provides additional compressive forces on the outer periphery of said clamping bushing to further reduce its diameter to effect clamping engagement of said clamping bushing with said spindle; the difference in the diameter of said clamping bushing and said clamp bore which provide the interference fit being such that clamping of the spindle is effected without completely overcoming said inference fit so as to maintain a rigid radial support for the spindle.

4. A machine tool comprising, in combination, support structure, a rotary spindle sleeve supported rotatably on said support structure for rotation in a predetermined location in relation to the support structure, a machining spindle slidably disposed in said sleeve for rotation therewith and having a machining end projecting from the sleeve and adapted to support a machining tool, said spindle being longitudinally adjustable with respect to said sleeve to extend said machining end of the spindle a variable distance from the sleeve, said sleeve including means defining a clamp bore substantially coaxial with said spindle and being substantially larger in diameter than said spindle, a clamping bushing having in its unstressed condition an outside size that is somewhat larger diametrically than the corresponding diametrical size of said clamp bore to provide an interference fit between said clamping bushing and said means defining said clamp bore, said clamping bushing being forced into said clamp bore so that the clamping bushing is encircled and engaged by said clamp bore defining means and is forcibly shrunk by the latter in diameter thereby producing in the clamping bushing a high residual stress in compression, the exterior surface of the clamping bushing and said clamp bore defining means being shaped in relation to each other to define therebetween a plurality of plenum cavities disposed in an annular pattern extending around the clamping bushing, said clamping bushing defining therein a spindle bore receiving said spindle and having a diameter, when said plenum cavities are under atmospheric pressure, that provides around the spindle a minimal clearance for longitudinal adjustment of the spindle; and said sleeve having high-pressure fluid supply means rotatable therewith and communicating with said plenum cavities to supply clamping fluid thereto under high pressure; the portion of said clamping bushing in the area of said plenum cavities having a substantial thickness to provide a relatively rigid interconnection with the portions of said bushing in engagement with said bore-defining means, such that said clamping fluid provides additional compressive forces on the outer periphery of said clamping bushing to further reduce its diameter to effect clamping engagement of said clamping bushing with said spindle; the diametrical difference between the clamp bushing and the clamp bore which provide the interference fit being such that clamping of the spindle is effected without completely overcoming said interference fit so as to maintain a rigid radial support for the spindle.

5. A machine tool comprising, in combination, support structure, a rotary spindle sleeve supported rotatably on said support structure for rotation in a predetermined location in relation to the support structure, a machining spindle slidably disposed in said sleeve for rotation therewith and having a projecting end adapted to support a machining tool, said spindle being longitudinally adjustable with respect to said sleeve to extend said projecting end of the spindle a variable distance from the sleeve, said sleeve including means defining a clamp bore substantially coaxial with said spindle and being substantially larger in diameter than said spindle, a clamping bushing having in its unstressed condition an outside diameter somewhat larger than the inside diameter of said clamp bore to provide an interference fit between said clamping bushing and said means defining said clamp bore, said clamping bushing being forced axially into said clamp bore so that the clamping bushing is encircled by said clamp bore defining means and is forcibly shrunk by the latter in diameter thereby producing in the clamping bushing a high residual stress in compression, the exterior surface of the clamping bushing and said clamp bore defining means being shaped in relation to each other to define therebetween plenum space for spindle-clamping fluid; said clamping bushing defining therewithin an axial bore receiving said spindle and having a diameter, when said plenum space in under atmospheric pressure, that provides around the spindle a minimal clearance for longitudinal adjustment of the spindle; said sleeve having means rotatable therewith for supplying clamping fluid under high pressure to said plenum space to effect clamping engagement with said spindle of structure of said clamping bushing opposed by said plenum space; and said clamping bushing having an outer diameter, measured with respect to the size that would be assumed by the bushing were it free of externally applied stress, that exceeds the inner diameter of said clamp bore by a dimension that is greater than the differential diametrical dimension by which the inner diameter of the bushing exceeds the outer diameter of the spindle when the bushing and the clamp bore defining means are assembled together and said plenum space is under atmospheric pressure with the consequence that upon supplying of hydraulic fluid under high pressure to said plenum space structure of the bushing unopposed by said plenum space is continuously forced into hard direct engagement with the encircling bore defining means by the residual compressive stress in the bushing and structure of the bushing opposed by said plenum space is forced into hard direct engagement with said spindle to strongly hold said spindle in its longitudinally adjusted position and in precisely coaxial relation to said spindle sleeve.

6. A machine tool comprising, in combination, support structure, a rotary spindle sleeve supported rotatably on said support structure for rotation in a predetermined location in relation to the support structure, a machining spindle slidably disposed in said sleeve for rotation therewith and having a machining end projecting from the sleeve and adapted to support a machining tool, said spindle being longitudinally adjustable with respect to said sleeve to extend said machining end of the spindle a variable distance from the sleeve, said sleeve including means defining a clamp bore substantially coaxial with said spindle and being substantially larger in diameter than said spindle, an outer bushing and an inner clamping bushing disposed in coaxial relation to each other, said outer and inner bushings having with reference to their unassembled and unstressed conditions a relative size relationship such that the diametrical size of the external periphery of the inner clamping bushing material exceeds the corresponding diametrical size of the internal periphery of the outer bushing to provide an interference fit between said inner and outer bushings, said inner clamping bushing being forced into said outer bushing so that the inner clamping bushing is encircled and engaged by said outer bushing and is forcibly shrunk by the latter in diameter thereby producing in the clamping bushing a high residual stress in compression, said inner and outer bushings being fitted into said sleeve clamp bore to provide between the latter and the exterior surface of said outer bushing close supporting contact extending around the outer bushing, said inner and outer bushings being shaped in relation to each other to define therebetween a plurality of plenum cavities disposed in an annular pattern extending around the clamping bushing; said clamping bushing defining therein a spindle bore receiving said spindle and having a diameter, when said plenum cavities are under atmospheric pressure, that provides around the spindle a minimal clearance for longitudinal adjustment of the spindle; and said sleeve having high-pressure fluid supply means rotatable therewith and communicating with said plenum cavities to supply clamping fluid thereto under high pressure; the portion of said clamping bushing in the area of said plenum cavities having a substantial thickness to provide a relatively rigid interconnection with the portions of said bushing in engagement with said bore-defining means, such that said clamping fluid provides additional compressive forces on the outer periphery of said clamping bushing to further reduce its diameter to effect clamping engagement of said clamping bushing with said spindle; the difference in diametrical size between the inner clamping bushing and the outer bushing which provides the interference fit being such that clamping of the spindle is effected without completely overcoming said interference fit so as to maintain a rigid radial support for the spindle.

7. A machine tool comprising, in combination, support structure, a rotary spindle sleeve supported rotatably on said support structure for rotation in a predetermined location in relation to the support structure, a machining spindle slidably disposed in said sleeve for rotation therewith and having a projecting end adapted to support a machining tool, said spindle being longitudinally adjustable with respect to said sleeve to extend said projecting end of the spindle a variable distance from the sleeve, said sleeve having thereon means defining a clamp bore substantially coaxial with said spindle and being substantially larger in diameter than said spindle, a clamping bushing having in its unassembled and unstressed condition an outside diameter that is materially larger than the corresponding inside diameter of said clamp bore to provide an interference fit between said clamping bushing and said means defining said clamp bore, said clamping bushing being forced into said clamp bore so that the clamping bushing is encircled and engaged by said clamp bore defining means and is forcibly shrunk by the latter in diameter thereby producing in the clamping bushing a high residual stress in compression, said clamping bushing and said clamp bore defining means being shaped in relation to each other to define therebetween plenum space for spindle-clamping fluid; said clamping bushing defining therewithin an axial bore receiving said spindle and having a diameter, when said plenum space is under atmospheric pressure, that provides around the spindle a minimal clearance for longitudinal adjustment of the spindle; and means for supplying clamping fluid under high pressure to said plenum space; the portion of said clamping bushing in the area of said plenum space having a substantial thickness to provide a relatively rigid interconnection with the portions of said bushing in engagement with the bore-defining means, such that said clamping fluid provides additional compressive forces on the outer periphery of said clamping bushing to further reduce its diameter to effect hard direct engagement with said spindle of structure of said clamping bushing opposed by said plenum space, structure of the bushing unopposed by said plenum space being continuously forced into hard direct engagement with the encircling bore defining means by the residual compressive stress in the bushing so that the bushing is positively held against radial displacement with respect to the sleeve and strongly holds said spindle in its longitudinally adjusted position and in precisely coaxial relation to said spindle sleeve; the difference in the diameter of said clamping bushing and said clamp bore which provides the interference fit being such that clamping of the spindle is effected without completely overcoming said interference fit so as to maintain a rigid radial support for the spindle.

8. A machine tool comprising, in combination, support structure, a rotary spindle sleeve supported rotatably on said support structure for rotation in a predetermined location in relation to the support structure, a machining spindle slidably disposed in said sleeve for rotation therewith and having a machining end projecting from the sleeve and adapted to support a machining tool, said spindle being longitudinally adjustable with respect to said sleeve to extend said machining end of the spindle a variable distance from the sleeve, said sleeve having means thereon defining a clamp bore substantially coaxial with said spindle and being substantially larger in diameter than said spindle, an outer bushing and an inner clamping bushing disposed in coaxial relation to each other, said outer and inner bushings having with reference to their unassembled and unstressed conditions a relative size relationship such that the diametrical size of the external periphery of the inner clamping bushing material exceeds the corresponding diametrical size of the internal periphery of the outer bushing to provide an interference fit between said inner and outer bushings, said inner clamping bushing being forced into said outer bushing so that the inner clamping bushing is encircled by said outer bushing and is forcibly shrunk by the latter in diameter thereby producing in the clamping bushing a high residual stress in compression, said inner and outer bushings being fitted into said sleeve clamp bore to provide between the latter and the exterior surface of said outer bushing close supporting contact extending around the outer bushing, said inner and outer bushings being shaped in relation to each other to define therebetween plenum space; said clamping bushing defining therein a spindle bore receiving said spindle and having a diameter, when said plenum space is under atmospheric pressure, that provides around the spindle a minimal clearance for longitudinal adjustment of the spindle; and said sleeve having high-pressure fluid supply means rotatable therewith and communicating with said plenum cavities to supply clamping fluid thereto under high pressure to effect outward tightening of said outer bushing against the encircling bore defining means and to effect hard direct engagement with said spindle of structure of said inner clamping bushing opposed by said plenum space, structure of said inner clamping bushing unopposed by said plenum space being continuously forced into hard direct engagement with said outer bushing by the residual compressive stress produced in said inner clamping bushing by virtue of said interference fit between said inner and outer bushings.

UNITED STATES PATENT OFFICE
CERTIFICATE OF CORRECTION

Patent No. 3,540,346                   Dated November 17, 1970

Inventor(s)   Gordon H. Jones

It is certified that error appears in the above-identified patent and that said Letters Patent are hereby corrected as shown below:

Column 5, line 8, after "of" omit -- a --

Column 10, line 66, change "for" to --bore--

Column 13, line 56, change "in" to --is--

Signed and sealed this 6th day of April 1971.

(SEAL)
Attest:

EDWARD M. FLETCHER, JR.
Attesting Officer

WILLIAM E. SCHUYLER, JR.
Commissioner of Patents

FORM PO-1050 (10-69)